United States Patent [19]
Kjellstrom

[11] Patent Number: 5,146,687
[45] Date of Patent: Sep. 15, 1992

[54] COMPASS

[76] Inventor: Bjorn Kjellstrom, Honey Hollow Rd., R.R. 2 Box 209, Pound Ridge, N.Y. 10576

[21] Appl. No.: 660,374

[22] Filed: Feb. 25, 1991

[51] Int. Cl.$^5$ .............................................. G01C 17/04
[52] U.S. Cl. ...................................... 33/355 R; 33/364
[58] Field of Search .................... 33/355 R, 364, 352, 33/348, 349, 272, 273, 274, 431

[56] References Cited

U.S. PATENT DOCUMENTS

| | | | |
|---|---|---|---|
| 736,925 | 8/1903 | Von Bezard | 33/272 |
| 1,474,394 | 11/1923 | Warburg | 33/364 |
| 1,891,068 | 12/1932 | Stahl, Sr. | 33/349 |
| 2,336,789 | 12/1943 | Jonsson | 33/364 |
| 3,871,108 | 3/1975 | Beaudout | 33/355 R |
| 4,335,521 | 6/1982 | Rutherford | 33/355 R |

FOREIGN PATENT DOCUMENTS

| | | | |
|---|---|---|---|
| 25787 | 6/1952 | Finland | 33/355 |
| 24331 | of 1896 | United Kingdom | 33/349 |

Primary Examiner—Thomas B. Will
Attorney, Agent, or Firm—Eric Y. Munson; Mark P. Stone

[57] ABSTRACT

The improvement of the present invention provides a camper's compass having a plate or member, such as an arcuate bow, having a direction pointer, which is pivotably mounted over the compass housing in such as way that it can swing between a normal forward position in which the compass is oriented in the desired direction of travel, and a diametrically opposed or reverse position. By pivoting the arcuate bow or member from its forward position to its reverse position, the user can set the return direction to the point of departure on the compass. The direction of a reverse path back to his point of departure is readily determined without making any mathematical calculations or trying to use the orienting means of the compass in reverse positions. This simplified manner of setting a return path on the compass eliminates confusion which otherwise may occur and result in disorientation of a user in his attempt to return to his point of origin.

20 Claims, 6 Drawing Sheets

COMPASS

BACKGROUND OF THE INVENTION

The present invention is primarily directed to campers' or hunters' compasses and more particularly to an improved compass providing means for enabling a user to readily ascertain a reverse direction of travel back to a point of origin without the need to make mathematical calculations or re-adjustments of the initial compass settings. The primary object of the invention is to avoid disorientation and confusion by hunters and campers in charting a return trip to the point of departure, e,g, a campsite. The invention is also designed for and easy to use, fast and exact for taking backbearings (compass bearings from a visible point at a distance away and towards the user"). Such backbearings are required for several tasks in land navigation.

The present invetion provides an improvement over a known compass sold under the registered trademark SILVA. This known compass, also termed as a protractorcompass, includes three (3) basic elements, namely, a rotatable compass housing, having indicia for orienting North, South, East and West and usually also a circular graduation (0-360); a magnetic compass needle, freely rotating in the housing to align itself with magnetic north; and a baseplate, usually with at least one straight edge parallel to a direction of travel lines(s). In operation of the known compass, the straight edge of the plate is aligned with a desired direction of travel on a map. Thereafter, the compass housing is turned such that the North indicators thereon are in alignment with actual magnetic North as designated on the map. To orient himself to the planned direction of travel, the user then holds the compass in his hand with the direction of travel arrow or line pointing straight ahead of him, and turns his body with the compass until the magnetic needle is rotated into alignment with the magnetic north indicators on the compass housing. Guided by the direction of travel arrow on the plate, which is permanently marked or mounted parallel to the straight edge of the baseplate, the user then proceeds to walk in a straight direction guided by the arrow. By checking now and then that the magnetic needle remains in alignment with the magnetic north setting designated by the compass housing, the user travels in the desired direction until reaching his destination.

It is quite common, that an outdoorsman, especially a hunter, uses his compass to stroll out from camp in a set direction and then wants to turn around and return to his starting point, e.g., is campsite, by backtracking. He may use his compass for this purpose in different ways. He may figure out the backbearing by adding 180 degrees to his compass setting on the way out, if that setting was less than 180 degrees, or by subtracting 180 degrees if the original setting was more than 180 degrees. Then he adjusts the orientation of the compass housing by setting it on this backbearing, and thereafter uses the compass in the normal way. In the alternative, he may use one of the orienting members of the compass in a reverse position, either by holding the compass plate in a reversed position, with the direction of travel arrow pointing towards himself and sighting the opposite direction, or by orienting the magnetic needle in a reversed position with its North end towards the South marking on the housing and then using the direction of travel arrow in the normal way for his return trip.

It is apparent that the "backtracking" procedures described above require either mathematical calculations or adjustments of initially set compass orientations to conform to the planned return trip. These calculations and/or manipulations and/or re-adjustments of the initial settings of the compass may easily result in imprecision, error or confusion in charting a return path, particularly if used by inexperienced outdoorsmen or used during adverse weather or poor visibility conditions, such as those experienced in the dusk of the evening. The result of errors or confusion in charting a return path under such circumstances may result in a hiker becoming disoriented and unable to find his way back to camp or other desired return location. In other words, he would get lost with potential tragic consequences.

The prior art compasses discussed above are described and illustrated in a brochure entitled "READ THIS OR GET LOST" by Silva Compass Co. and in a book entitled "BE EXPERT WITH MAP AND COMPASS" authored by the applicant, Scribner-MacMillan).

It is the primary object of the present invention to provide means on the compass for automatically setting a backbearing indicating the return path or travel back to a campsite or other point of departure, without requiring any adjustment of the initial compass settings, physical re-orientation or manipulation of the compass relative to the user, or any mathematical calculations made by the user. In this manner, the return path to the campsite is charted in a simplified manner which greatly reduces confusion, miscalculation, imprecision or error by the user. The improved compass also has a positive psychological effect, substantially increasing a users' self-reliance on his tracking skills and abilities.

SUMMARY OF THE INVENTION

The present invention provides a compass including a compass housing with circular degree graduation, where either the housing itself with the graduation is rotatable, or the graduation is on a separate ring which is rotatable on the housing. The housing encloses a freely rotatable magnetic needle for indicating the magnetic North, and the housing may be rotatably mounted on a base plate. The base plate also includes a direction of travel arrow, which also serves the purpose of being an index for graduation settings or readings. The arrow is permanently engraved on the base plate as part of a direction of travel line which is parallel to at least one edge of the base plate.

The improved compass is used to establish a desired path of travel from a point of origin to a point of destination by placing the compass on the map so that one of its direction of travel lines, e.g. the straight edge of the base plate, connects the point of origin with the point of destination. To set the bearing on the compass, the user now turns the housing until one of its parallel lines indicating magnetic north is aligned with the magnetic north as indicated on the map. With the bearing set on the compass, he takes it in his hand, he turns himself with the entire compass without changing the setting of the housing, until the magnetic needle is moved into alignment with the magnetic north orientation of the compass housing. Now, the direction of travel indicator shows the desired direction of travel to be followed.

A pivotable member, such as but not limited to a semicircular arcuate bow having a pointer element extending from the center thereof, is pivotably mounted to the compass baseplate over the rotatable compass housing. The direction pointer on the arcuate bow is oriented so that it is in axial alignment with the direction of travel arrow on the forward end of the compass baseplate in a first position of the arcuate bow. This arcuate bow (or other type of pivotable member such as a plate or other structure that may be suitable for the same purpose) is selectively pivotable 180 degrees to the compass base into a second functional position in which the pointer on the bow is oriented in a completely opposite or reverse direction (180 degrees out of phase) from the first position of the arcuate bow. Accordingly, when a user is travelling away from his point of origin, the arcuate bow is pivoted into its first position, in alignment with the forwardly oriented direction of travel-arrow on the baseplate.

When the camper desires to return to the point of origin, the arcuate bow is merely pivoted 180 degrees into its second position (the reverse or return position), and the pointer on the bow directs the camper back towards his point of origin. He uses the compass now in effect as if it were turned around 180 degrees. The "backtracking" procedure is effectuated without any mathematical calculations or re-adjustment of the initial settings of the compass housing. Confusion, mistakes and error are significantly reduced by using the improvement of the present invention for "backtracking".

DESCRIPTION OF THE BEST MODES FOR CARRING OUT THE INVENTION

Figures 1, 2, 3:
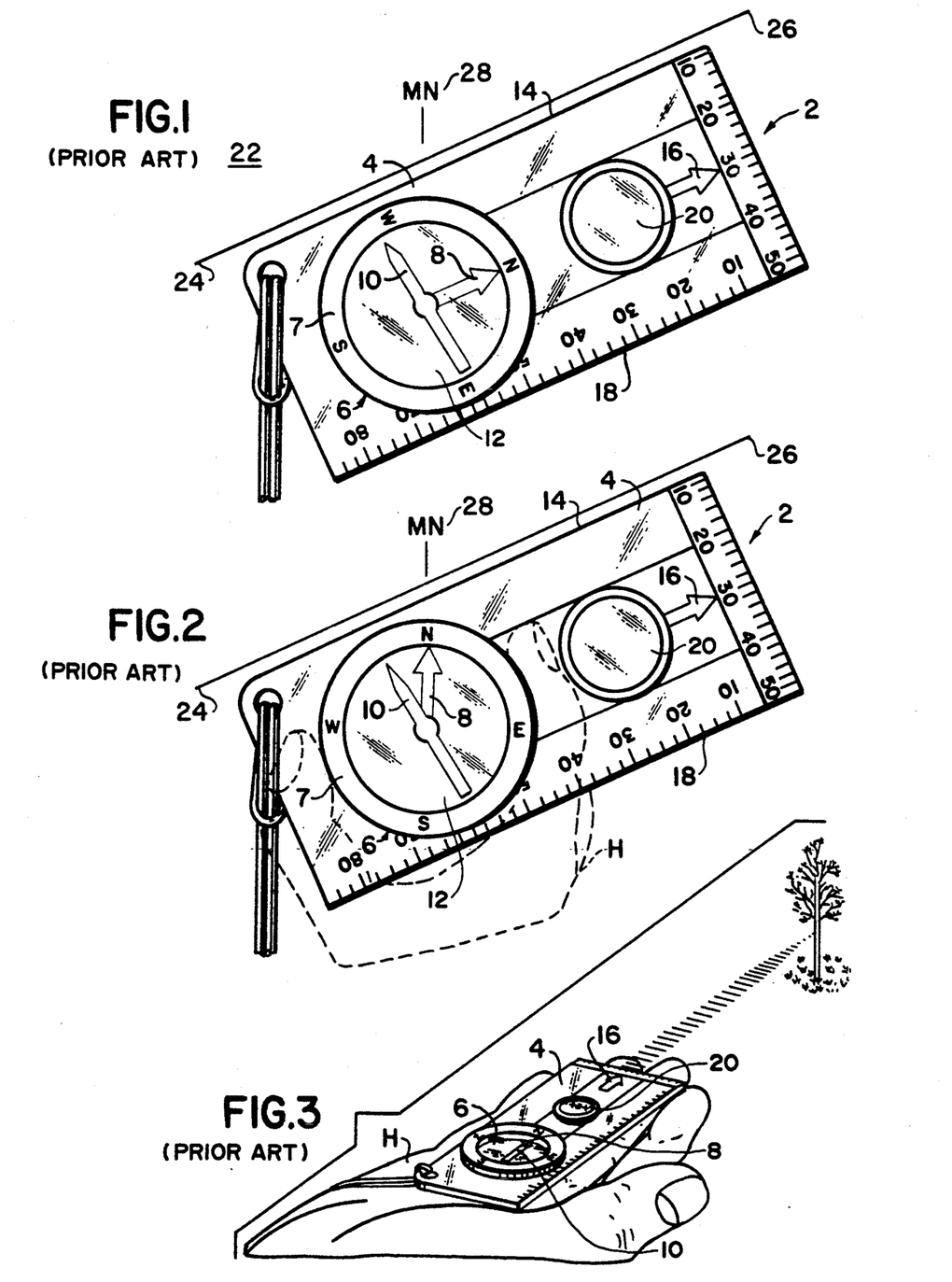
FIGS. 1-3 of the drawings illustrate a prior art compass and the manner of using the same to chart a path from a predetermined point of origin to a predetermined point of destination.

FIGS. 1-3 of the drawing illustrate a prior art embodiment of one of the types of compass to which the present invention is generally directed. The compass, which is generally designated by reference numeral 2, includes a baseplate 4 preferably of rectangular shape, transparent and molded from durable plastic, such as Plexi. A circular compass housing 6 is rotatably mounted on the baseplate 4. The compass housing includes a peripheral rim 7 with markings engraved or printed, for graduation (0° to 360°) and for cardinal points (North, South, East and West) of the compass. The bottom of the compass housing includes a north indicating arrow 8 permanently pointing to the North orientation (0° or 360° point) marked on the rim 7 of the compass housing 6. This North orientation arrow can be engraved or printed on a separate bottom plate in the housing, and is adjustable such that it can be set for East or West declination of magnetic North.

A magnetic needle 10 is freely rotatably mounted on a pin within the compass housing. A transparent cover 12 may be provided over the top of the compass housing, and a magnifying lens 20 may be provided in the baseplate.

The compass baseplate 4 includes at least one longitudinally extending straight edge 14 and a direction of travel arrow 16 permanently engraved or applied in any other suitable manner at the center of the forward end of the baseplate 4. The arrow 16 is oriented parallel to the straight edge 14 and points directly forward of the baseplate 4. The direction line starting at the forward circumference of the housing and ending in the center of the arrowhead is also used as an index for reading the degrees on the rim of the housing, which provide the direction of travel bearing. The baseplate may also include measuring scales 18 applied to the lateral sides thereof, or to the forward or rear ends.

In operation of the prior art compass illustrated by FIGS. 1-3, the transparent baseplate 4 is placed atop a map 22. A straight longitudinal edge 14 of the baseplate 4 is positioned on a straight line connecting an intended point of departure 24 designated on the map 22 and an intended point of destination 26 designated on the map 22. Thereafter as illustrated by FIG. 2, the compass housing 6 is rotated such that the North orienting arrow 8 in the bottom of the housing is parallel with (aligned with) the magnetic north (north lines) 28 on the map 22 with the north end of the arrow 8 pointing to the North of the map 22.

When this completed, the direction of travel from the point of departure to the point of the destination (the bearing) is set on the compass. The user takes it in his hand, holds it pointing straight forward from him, and turns himself around with the compass as a part of his body until the magnetic needle 10 is in alignment with the North indicating arrow 8 in the bottom of the compass housing as illustrated by FIG. 3. The direction of travel arrow 16 on the compass plate now points in the desired path of travel by the user, who proceeds in this direction, checking now and then that the magetic needle remains in its alignment with the oriented lines in the bottom of the housing.

When the user wishes to reverse his direction of travel to return to his point of departure 22, campsite, parked car or other desired location, he must reset the compass or for his return travel. This can be done in different ways. He may determine the backbearing mathematically by adding 180 degrees to the compass setting he used on his way out, if the setting was less than 180 degrees, or by subtracting 180 degrees if the original setting was more than 180. The the user sets his compass on his determined backbearing by turning the compass housing and reading the degree on the graduated rim of the housing. Thereafter, the user sights his direction of travel in the normal way.

Another method of reversing travel is to use one of the oriented members of the compass, the magnetic needle or the baseplate, in a "reverse position". The user either holds his compass for sighting in a reversed position with his direction of travel arrow pointing towards him and then sighting his return travel with the direction arrow reversed, or the user may orient the magnetic needle in a reversed position with its North end towards the South marking in the bottom of the compass housing and then use the direction of travel in the normal way for his return trip.

Figure 4:
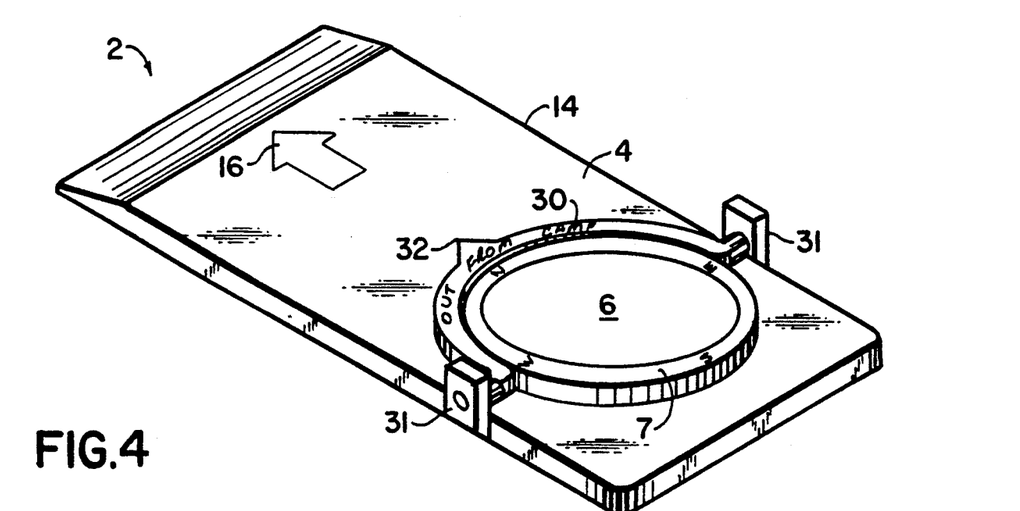
FIG. 4 illustrates a first embodiment of the improved compass of the present invention in which an arcuate bow is mounted to a prior art compass of the type illustrated by FIGS. 1-3.
Figure 5:
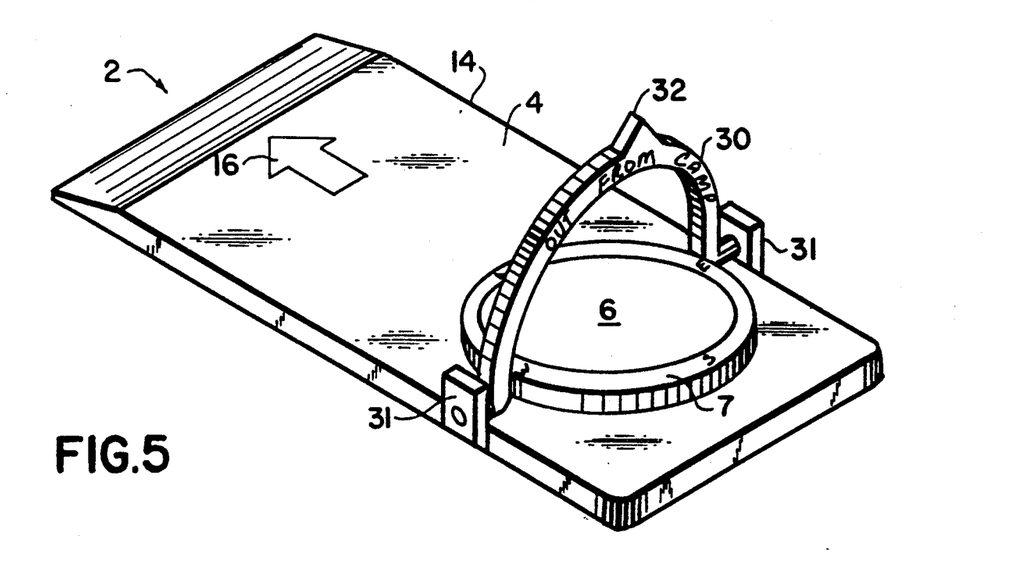
FIG. 5 of the drawing illustrates the improvement of FIG. 4 showing the arcuate bow being pivoted from a first position and into a second position.

FIGS. 4 and 5 of the drawing illustrate the compass 2 of FIGS. 1-3, including one embodiment of the improvement of the present invention. The same reference numerals have been used to designate corresponding elements. A member 30, such as but not limited to an arcuate, semi-circular bow, is pivotably mounted to the baseplate 4 of the compass by opposed mounting means 31 affixed to opposed lateral sides of the compass baseplate 4. The arcuate member or bow 30 defines a pointer element 32 extending from the proximate center of the bow. The inner radical dimension of the bow, as measured from the center of the compass housing 6, is subatantially equivalent to the outer radius of the compass housing such that the bow complements the configuration of the circular compass housing. The bow is pivotably mounted to the baseplate such that the axis of pivot of the bow is transversely oriented relative to the longitudinal direction of the baseplate 4, and the axis of pivot diametrically passes through the center of the circular compass housing. The bow 30 may be marked with directional indicia such as degree gradients, or markings which generally designate if the pointer 32 is directed towards a point of designated ("out from camp") or a point of departure ("back to camp").

One example of the operation of the improved compass illustrated by FIG. 4 is discussed as follows. In FIG. 4 of the drawing, the bow 30 is in a first position in which the pointer 32 defined on the bow is in axial alignment with the direction of travel arrow 16 defined on the forward end of the compass baseplate 4. In this first position, the bow 30 is flush against the upper surface of the compass baseplate and may be marked "OUT FROM CAMP" or another suitable designation which is visible in the first position.

FIG. 5 of the drawing illustrates the bow 30 in the process of being pivoted from its first position shown in FIG. 4 in a second position in which the pointer 32 is oriented in a direction diametrically opposed to the direction of travel arrow 16 on the forward end of the compass baseplate 4. In this second position, the bow 30 is flush against the top surface of the compass baseplate 4 and bears a reminder legend as "BACK TO CAMP" which is now visible by the user as he has pivoted the bow 180 degrees around, so it is upside down from its first position. The reminder texts, "Out from Camp" and "Back to Camp" are on opposite sides of the arcuate bow. The two sides of the bow can also include other direction instructions, including degree gradients.

In operation of the improvement of the present invention, the initial orientation of the compass in a direction towards the intended point of destination is established in the same manner as discussed with respect to FIGS. 1-3. During this procedure, the bow 30 is in its first position in which the pointer 32 is in axial alignment with the direction of the travel arrow 16 on the forward end of the compass baseplate. However, when the user is on a roaming trip "in and out", "to and from" and has decided to turn around and return, he "flip-flops" (pivots) the bow 30 into its second position in which the pointer 32 is turned over in a reverse direction diametrically opposed to the direction of travel arrow 16 at the forward end of the baseplate. Now he can read the reminder legend "Back to Camp".

It is apparent that the use of the bow 30, with its associated pointer element 32, readily enables the user to properly set his compass for the return path to camp (point of departure) simply, quickly and efficiently. The return path is established without confusion or error, since there is no need to make any mathematical calculations or to re-adjust the use of the direction indicators of the compass.

When the present invention is used to take a back-bearing, the user sets the arcuate bow in its second position. He then holds the compass in his hands and sights with the direction of travel arrow on the plates towards the point for which he wants to establish the back bearing. He turns the compass housing until the magnetic needle in the housing is aligned with the North orienting lines in the bottom of the housing. Now he can read the backbearing at the arrow of the bow.

Other modifications and variations within the scope of the present invention become apparent to those skilled in the art of map-and-compass reading. For example, although the preferred embodiment of this invention employs a bow element 30 which is semicircular and arcuate in shape and configured to complement the outer surface of the housing, members of other shapes and configurations may also be suitably employed in the present invention. Instead of the bow element, one can use square or rectangular plate with a semicircular cut-out fitting around the outer edge of the round compass housing. Moreover, although the pointer element 32 is described and illustrated as being integrally formed in the center of the pivotal element 30, the pointer element may also be a separate element mounted to the pivotal element, or may be pointer indicia directly marked on the pivotal element. Preferably, the pivotal element 30 and the associated pointer 32 will be formed from a plastic material in a color to contrast with that of the transparent base so that the direction of the pointer element 32 will be readily visually perceivable to the user. It is apparent that the improvement of the present invention may be readily retrofitted ito the existing prior art compasses. Although the improvement to the compass has been illustrated with respect to a known compass having a compass housing mounted on a baseplate, it may also be used with the compasses having only a housing and no baseplate, or with wristwatch type compasses.

Figure 6:
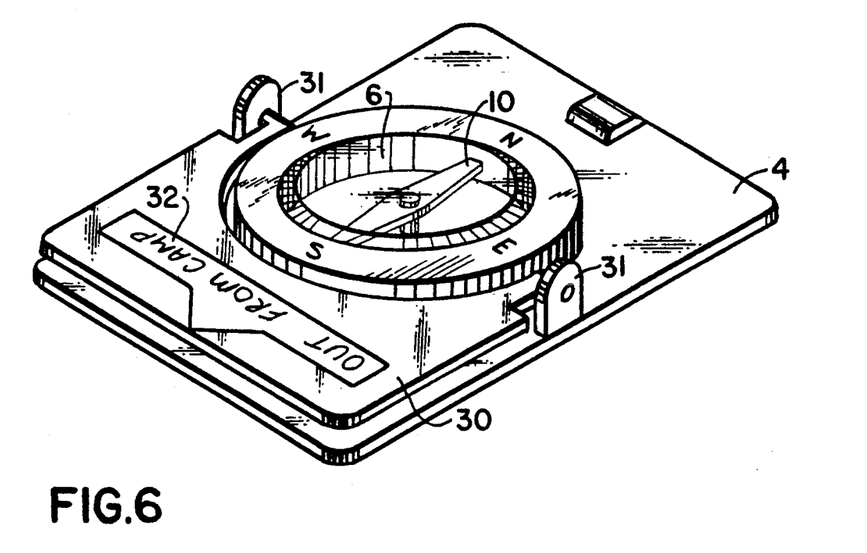
FIGS. 6-8 illustrate a second embodiment of an improved compass.
Figure 7:
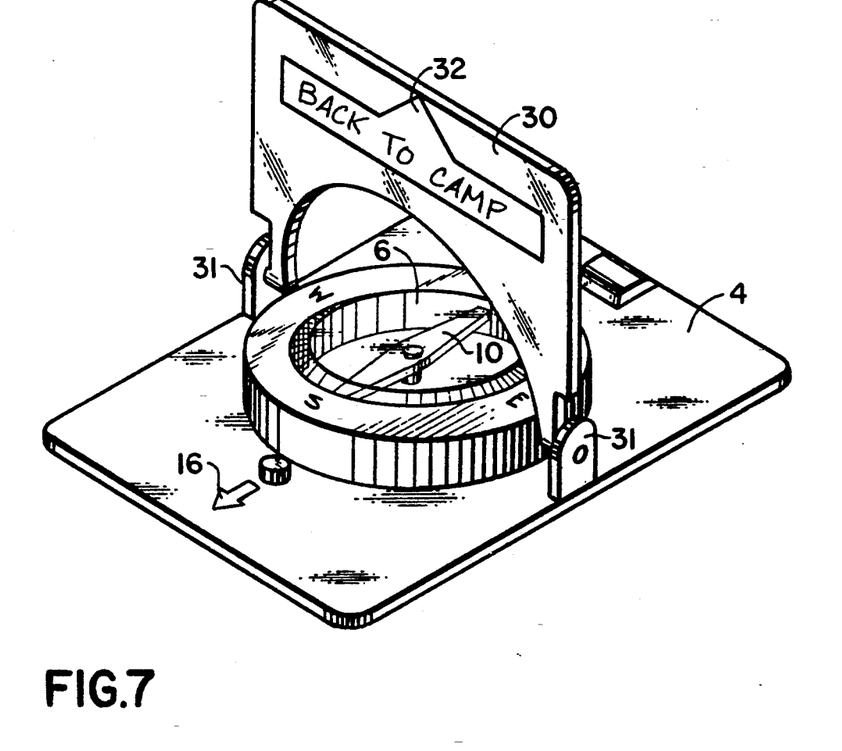
Figure 8:
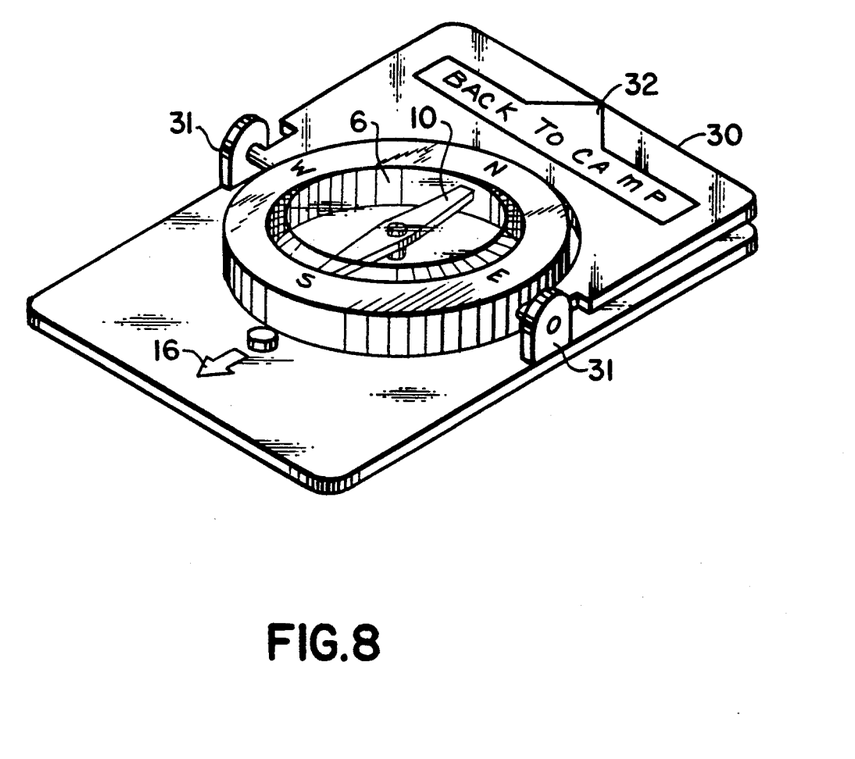

FIGS. 6-8 illustrate a second embodiment of the improved compass in accordance with the present invention. Corresponding elements have been designated with the same reference numerals as illustrated in FIGS. 1-5. In this second embodiment of the improved compass, the pivotal element 30 is generally configured as a rectangular member having a cut-out portion adapted to complement the outer circumference of the circular compass housing 6. The pointer means 32 include a written legend and arrow applied directly to the pivotal member 30. As in the previously discussed embodiment of the invention, the pivotal member 30 is mounted to the baseplate 4 by two opposed mounting means affixed to the baseplate at the respective lateral sides thereof. Operation of this second embodiment of the invention is the same as that described with respect to the first embodiment of the invention. More specifically, FIG. 6 illustrates the pivotal member 30 in a first position designating a direction "Out from Camp", FIG. 7 illustrates the member 30 being pivoted from its first position into a second position, and FIG. 8 illustrates the pivotal member in its second position indicating the direction "Back to Camp".

FIGS. 9-12 illustrate a third embodiment of the improved compass in accordance with the present invention. Elements which correspond to those discussed in earlier embodiments have designated with the same reference numerals. The pivotal member 30 and the pointer element 32 in this embodiment are similar to that disclosed by FIGS. 4-5—namely, the element 30 is an arcuate bow and the pointer element 32 extends from the proximate center of the bow. However, unlike the earlier disclosed embodiment of the invention, this third embodiment of the invention pivotably mounts the element 30 directly to diametrically opposed points on the outer circumference of the compass housing 6. Moreover, this embodiment of the invention further includes a reverse direction of travel arrow 17 permanently applied to the baseplate 4. The arrow 17 is in axial alignment with forward direction of travel arrow 16, but points towards the rear direction of the baseplate 180 degrees out of phase with respect to forward arrow 16.

Figure 9:
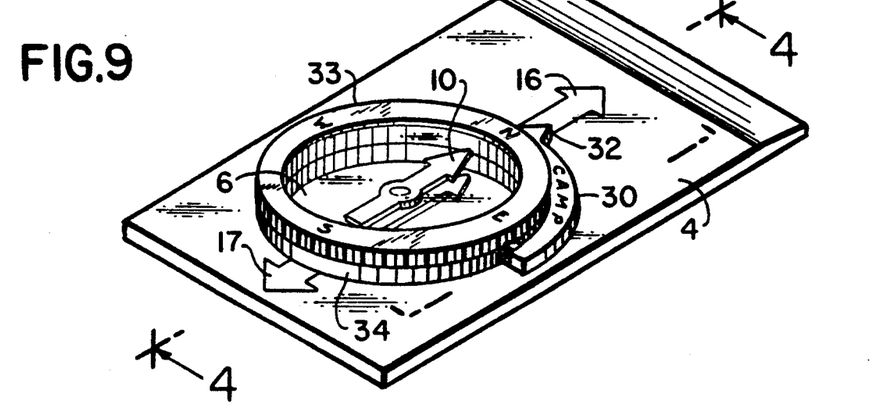
FIGS. 9-12 illustrate a third embodiment of an improved compass.
Figure 10:
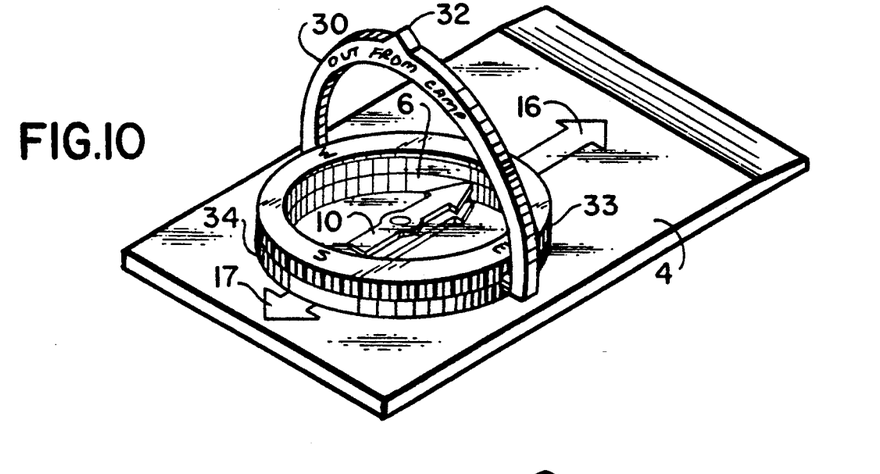
Figure 11:
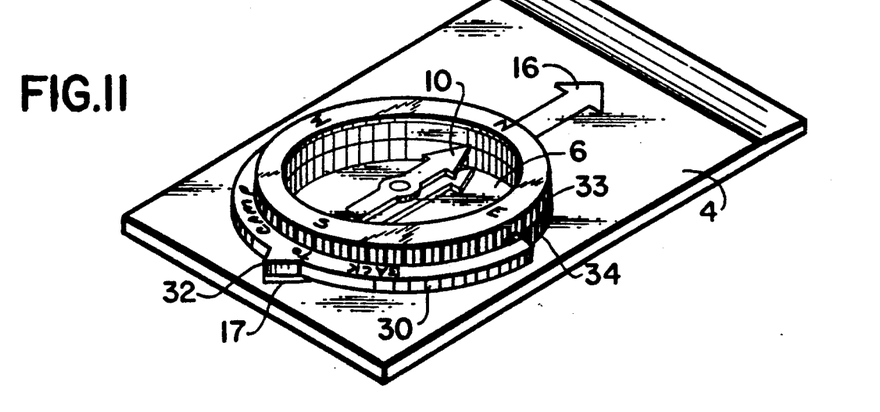

FIG. 9 of the drawing illustrates the arcuate bow 30 in its first forward (Out from Camp) position flush against the baseplate 4, FIG. 10 illustrates the arcutate bow being pivoted between its first position and a second reverse position, and FIG. 11 illustrates the acurate bow 30 flush against the baseplate 4 in its second reverse (Back to Camp) position. When the arcuate bow 30 is in its second (reverse) position, the pointer element 32 is positioned directly atop the reverse arrow of travel 17 on the baseplate.

Figure 12:
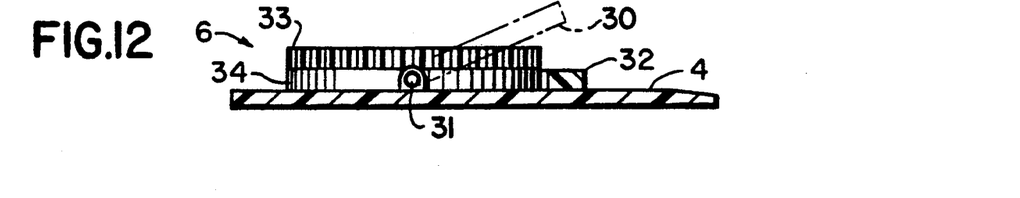

FIG. 12 of the drawing illustrates a side elevational view of FIGS. 9-11. This drawing figure clearly illustrates that the compass housing 6 includes a lower housing portion 34 which is permanently affixed to the upper surface of the baseplate 4, and an upper housing portion 33 which is selectively rotatable relative to the lower housing portion 34 and the baseplate 4. The upper housing portion 33, which carries degree gradients permanently inscribed thereon, is selectively rotatable by the user for setting his path of travel, as discussed above. The pivotal member 30 is mounted directly to the fixed lower compass housing portion 34 so as not to obstruct rotation of the upper compass housing portion 33 by the user. It is apparent from FIG. 12 that the improvement of the present invention may be used on a compass not habing any baseplate at all. This can be accomplished by applying a direction of travel arrow (such as arrow 16) permanently and directly on the stationary lower compass housing to enable rotation of the upper compass housing 33 relative to the permanent direction of travel arrow on the stationary lower compass housing.

Figure 13:
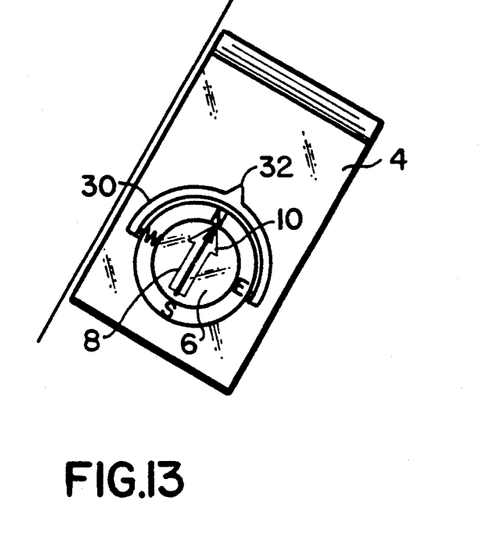
FIGS. 13-16 schematically illustrate one method of use of the improved compass for backtracking to a point of origin.
Figure 14:
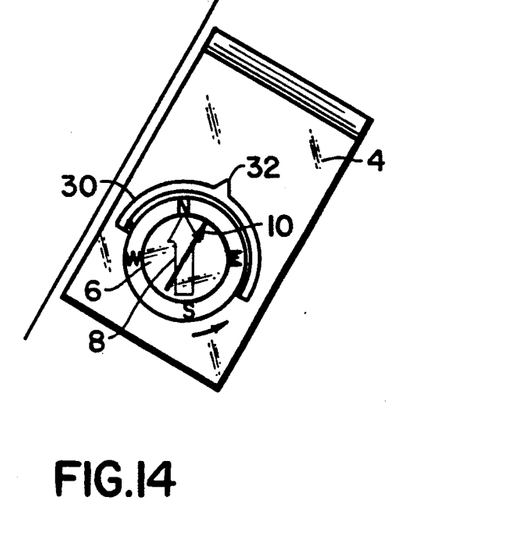
Figure 15:
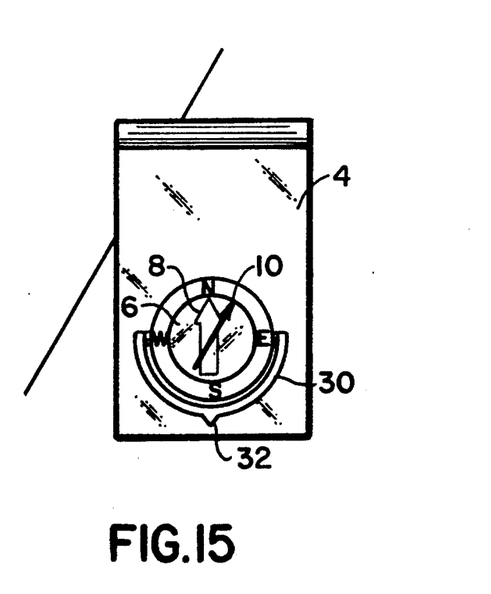
Figure 16:
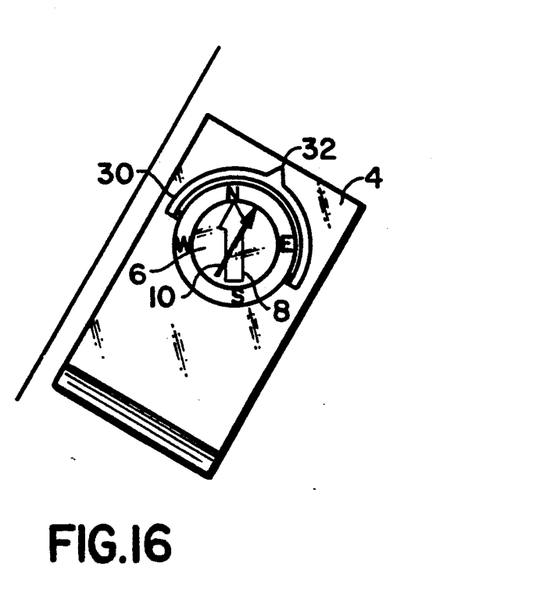

FIGS. 13-16 of the drawings schematically illustrate one possible backtracking procedure using a compass in accordance with the present invention. Corresponding elements have been designated with the same reference numerals as used in the earlier drawing figures. Referring to FIG. 13, the magnetic needle 10 is in alignment with the North pointing arrow 8 in the compass housing. The arcuate member 30 is in its forward (Out from Camp) position and the pointer 32 on the arcuate member 30 is pointing towards magnetic North. In FIG. 14, the arrow 8 has been rotated out of alignment with the needle 10 by rotating the compass housing 6 such that the arrow 8 sets a forward path of travel for the user. The user then follows the direction of arrow 8, making sure that needle 10 remains in alignment with pointer 32. When the user desires to return to camp, the arcuate member 30 is pivoted into its reverse (Back to Camp) position as illustrated in FIG. 15. Thereafter, the baseplate 4, which is held in the hands of the user, is rotated until the magnetic needle 10 is again in axial alignment with pointer 32 of the pivotal element 30 as seen in FIG. 16. The user then follows the arrow 8 back to camp, periodically checking that the magnetic needle 10 remains in axial alignment with the pointer 32. The method of forward and backtracking is accomplished without use of a direction of travel arrow since the pointer 32 and the North indicating arrow 10 effectively perform this function.

Other modifications within the scope and spirit of the present invention will become apparent to those skilled in the art. Accordingly, the description provided herein of the preferred embodiments of the invention are intended to be illustrative, and not restrictive of the scope of the invention, that scope being defined by the following claims and all equivalents thereto.

I claim:

1. A compass of the type including a compass housing, a freely movable magnetic needle pointing to magnetic North enclosed within said compass housing, said compass housing having direction orienting indicia thereon, said improvement comprising:

directional indicating means pivotably mounted relative to said compass housing and movable between a first position in which said means is oriented to indicated a forward direction of travel selectively established by said direction orienting indicia on said housing and a second position in which said means is oriented to indicate a reverse direction of travel selectively established by said direction orienting indicia on said housing.

2. The compass as claimed in claim 1 wherein said directional indicating means is pivotable 180 degrees between said first and said second positions.

3. The compass as claimed in claim 1 wherein said directional indicating means is a pivotal member.

4. The compass as claimed in claim 3 wherein said pivotal member is an arcuate bow.

5. The compass as claimed in claim 4 wherein said arcuate bow includes a pointer element adapted to point in an outward direction relative to said bow.

6. The compass as claimed in claim 5 wherein said pointer element is defined integrally on said bow.

7. The compass as claimed in claim 5 wherein said pointer element is located substantially at the circumferential center of said bow.

8. The compass as claimed in claim 5 wherein said bow is shaped and dimensioned to conform to a portion of the outer surface of said compass housing when said bow is in said first and second positions.

9. The compass as claimed in claim 1 wherein said directional indicating means is a plate-like member.

10. The compass as claimed in claim 9 wherein said member includes a cut-out portion corresponding at least to a portion of the configuration of said compass housing.

11. The compass as claimed in claim 1 wherein said directional indicating means is pivotably mounted directly to said compass housing.

12. The compass as claimed in claim 1 wherein said directional indicating means is a plate having a semi-circular cut-out fitting around a portion of said compass housing.

13. The compass as claimed in claim 5 wherein said pointer element includes visual indicia applied directly to said arcuate bow.

14. The compass as claimed in claim 9 further including a pointer element extending from said pivotal member.

15. The compass as claimed in claim 14 wherein said pointer element is integrally connected to said pivotal member.

16. The compass as claimed in claim 14 wherein said pointer element includes visual indicia applied directly to said pivotal member.

17. In a compass of the type including a base having a frond end, a rear end, and at least one straight longitudinally extending edge; a compass housing including directional orienting indicia rotatably mounted on said base; and a magnetic needle freely rotatably mounted within said compass housing; improvement comprising:

directional indicating means mounted to said base and pivotal over said compass housing between a first position in which said means is oriented towards said front end of said base and substantially parallel to said at least one longitudinally extending edge and a second position in which said means is oriented towards said rear end of said base and substantially parallel to said at least one longitudinally extending edge.

18. The compass as claimed in claim 17 wherein said directional indicating means is a pivotal member.

19. The compass as claimed in claim 18 wherein said pivotal member includes a pointer element for designating a forward direction of travel when said pivotal member is in said first position and a reverse direction of travel when said pivotal member is in said second position.

20. In a compass of the type including a compass housing enclosing a freely movable magnetic North pointing needle, said compass housing having directional orienting indicia marked thereon and being relatively rotatable to a supporting member, said directional orienting indicia including degree gradiations in the range of 0 degrees–360 degrees, and cardinal and/or intercardinal points marked on a rim of said compass housing, the improvement comprising:

direction indicating means pivotably mounted relative to said compass housing and movable in the range of 0 degrees–180 degrees between a first forwardly oriented indicating position and a second reverse oriented indicating position, said first and second positions being 180 degrees out of phase from each other, said pivotal member including pointer means thereon for selectively indicating when said pivotal member is in said first and said second positions.

* * * * *